United States Patent [19]

Sambrook et al.

[11] Patent Number: 5,772,953
[45] Date of Patent: Jun. 30, 1998

[54] PRODUCTION OF CERAMIC ARTICLES

[75] Inventors: Rodney Martin Sambrook; Robert Terence Smith, both of Sheffield, Great Britain

[73] Assignee: Dytech Corporation, Ltd., Sheffield, Great Britain

[21] Appl. No.: 737,119

[22] PCT Filed: May 10, 1995

[86] PCT No.: PCT/GB95/01062

§ 371 Date: Nov. 4, 1996

§ 102(e) Date: Nov. 4, 1996

[87] PCT Pub. No.: WO95/30631

PCT Pub. Date: Nov. 16, 1995

[30] Foreign Application Priority Data

May 10, 1994 [GB] United Kingdom ................... 9409258

[51] Int. Cl.⁶ ................................................. C04B 38/06
[52] U.S. Cl. ......................... 264/638; 264/639; 264/645; 264/669; 264/670; 264/432
[58] Field of Search ............................. 264/63, 638, 639, 264/645, 669, 670, 432

[56] References Cited

U.S. PATENT DOCUMENTS

| | | | |
|---|---|---|---|
| 3,998,917 | 12/1976 | Adelman | 264/63 |
| 4,587,068 | 5/1986 | Borase | 264/63 |
| 4,894,194 | 1/1990 | Janney | 264/63 |
| 4,906,424 | 3/1990 | Hughes | 264/63 |
| 4,978,643 | 12/1990 | Venkataswamy | 264/63 |
| 5,028,362 | 7/1991 | Janney | 264/328.2 |
| 5,082,607 | 1/1992 | Tanse | 264/63 |
| 5,145,908 | 9/1992 | Janney | 264/63 |

FOREIGN PATENT DOCUMENTS

| | | |
|---|---|---|
| 130031 | 1/1985 | European Pat. Off. . |
| 532113 | 3/1993 | European Pat. Off. . |
| WO-8807505 | 10/1988 | WIPO . |
| WO-8907583 | 8/1989 | WIPO . |
| WO-9222509 | 12/1993 | WIPO . |

OTHER PUBLICATIONS

Schildknecht, Calvin E., Vinyl and Related Polymers, John Wiley & Sons, New York, 1952, p. 299.

*Primary Examiner*—James Derrington
*Attorney, Agent, or Firm*—Caesar, Rivise, Bernstein, Cohen & Pokotilow, Ltd.

[57] ABSTRACT

A water soluble acrylate is polymerised to bind ceramic particles in a dispersion. The polymer is then burned away.

4 Claims, No Drawings

PRODUCTION OF CERAMIC ARTICLES

The invention relates to the production of ceramic articles by making shaped bodies from a monomer containing dispersion of ceramic particles, polymerising to form a green body which is then dried and sintered. In particular to a method of producing ceramic articles of high density by a process called gel casting.

Gelcasting is a technique for moulding ceramic powders and is outlined in articles in J Amer Ceram.Soc 74(3) 612–18 (1991) and Ceramic Bulletin 70(10) 1641–1649 (1991); and in a paper "Forming of Silicon Nitride by Gelcasting", Soc. Automotive Engineers, Proc. Annual Automotive Technology Development Contractors Coordination Meeting pages 243 and 245–251, 1991. In this method an article is cast from a concentrated aqueous suspension of a ceramic powder in a solution of a polymerisable monomer and then polymerising. Two systems have been proposed: one based on acrylamide and the other based on acrylates. In the first case an acrylamide undergoes a vinyl polymerisation and the product is a strong crosslinked polymer-water gel filled with ceramic powder. This is dried and processed further. The polymerisation of the acrylamide is carried out using an initiator and catalyst, together with a crosslinking compound such as N,N'-methylenebisacrylamide. Ammonium persulphate can be used as the initiator and tetramethylethylenediamine as the catalyst. Such a system is the subject of U.S. Pat. Nos. 5,028,362, 5,082,607 and 5,145,908.

The second proposal is based on the use of acrylates. The paper in Ceramic Bulletin Vol 70(1), 1991 reports extensively on different acrylate systems tested and on page 1645 concludes:

"The development of the acrylate system was limited by the following drawbacks. (1) They are not purely aqueous systems as a cosolvent for example NMP in addition to water is needed. (2) The premix solution inevitably produced an incomplete gel either as a result of solvent overloading or syneresis. (3) The incomplete gelation of the premix solution extended to the slurry mixture, which also only gelled partially. The presence of initiators led to unpredictable gelling reactions even at room temperature as the premix aged. (4) The dispersion of RC-152 in this system was poor. At 50% solids loading only DARVAN C gave a slurry that would just flow. Even then the slurry was dilatant. Because of the problems encountered in the acrylate systems there was therefore a need to develop a process that used only water as the solvent and that did not possess the limitations of the acrylate system. The acrylamide-based system was developed to meet this need."

It has now been discovered that by selection of a class of acrylates the drawbacks indicated above can be sidestepped, allowing gelcasting to take place effectively and to produce articles of notably high density. The acrylates in question are those which are essentially water soluble and which leave no residues after heat treatment.

According to the invention in one aspect there is provided a method of making ceramic article, the method comprising the steps of forming an aqueous dispersion comprising water, particles of ceramic material, and as a polymerisable monomer an ammonium acrylate and/or ammonium methacrylate, polymerising the monomer to produce a matrix containing the ceramic particles and the water removing the water to provide a self supporting article comprising the ceramic particles in a matrix of the polymer, and heating the resultant product to remove the matrix and to cause densification of the formed ceramic article.

The selected polymerisable monomer will provide a matrix, e.g. a gelled network when polymerised, to stabilise the ceramic particles before and after removal of the water. In contrast to acrylamide the water soluble acrylate monomers are of low toxicity. The acrylate monomer is selected to be substantially or wholly water soluble so that co-solvents are avoided and a dispersion and matrix can form which is why water-soluble ammonium acrylate and ammonium methacrylate are used.

It is preferred to form a premix solution comprising the monomer (or monomers), a crosslinking agent, e.g. N,N'-methylenebisacrylamide and water (preferably deionized). The polymerisation may be initiated by a suitable initiator such as ammonium persulphate or the like; and catalysed by a suitable catalyst such as triethanolamine or tetramethyethylenediamine or heat generated, e.g. by microwave or ultraviolet light energy.

Preferably the dispersion is de-aerated before polymerisation.

It is preferred to control the onset and duration of polymerisation by the selection of the additives; by their concentration; and temperature.

Preferably the polymerisation is carried out under an inert atmosphere.

It is an advantageous feature of the method of the invention that the dispersion containing the water-soluble acrylate monomer is polymerised quickly to form a homogeneous mass which can be converted into a strong solid dense body. By the use of the selected acrylate the need for auxiliary solvents is avoided; the ingredients have little or no toxicity; they leave no residues after the sintering step. These advantages do not apply to other acrylate derivatives such as the sodium salt.

The mechanical strength of the article will depend on the concentration of the acrylate monomer in the dispersion. It is an advantage to keep the concentration of the monomers to a minimum to reduce the need to remove them at a later stage.

The nature of the dispersion will depend on the average size of the ceramic particles; preferably the particle size is selected so that a colloidal dispersion is formed. The particles will be selected according to the intended use of the product. Preferably the proportion of particles is relatively high so that a slurry-type dispersion is formed, say in excess of 45% by volume. This is preferably achieved by including a dispersing agent in the dispersion. Preferred dispersants are polyelectrolytes selected so that they are absorbed on to the surface of the ceramic particles and repel each other, so preventing flocculation and the formation of a high viscosity slurry. Suitable polyelectrolyte dispersants include ammonium salts of polyacrylate and polymethacrylate.

The ceramic material may be metallic, non-metallic, non-oxide ceramic and cermets. The ceramic particles may be oxides, silicides, carbides, nitrides, and the like. Specific materials include alumina, cordierite, magnesia, mullite, silica, silicon nitride, silicon carbide, barium titanate, silicon nitride, titania, tungsten nitride, zirconia; and the like.

Additives may be present provided that they do not adversely affect the formation of the dispersion and the matrix and the subsequent removal of the water.

The composition may be shaped in a mould to form an article of predetermined shape. The composition may be moulded in a suitable mould as in injection moulding and extrusion moulding. The composition may also be used to mould about a former, e.g. to form a thin walled tube, thermocouple sheath, a crucible; or the like. In such a case the former is preheated and then dipped into the dispersion containing a polymerisation initiator until sufficient catalysed composition has built up on the former; which is then removed, and subjected to dewatering followed by heating.

The green article, i.e. the polymerised article after removal of the water, has sufficient strength for it to be machined.

In a preferred aspect the invention provides a method for the purpose specified comprising the steps of forming an aqueous slurry comprising a high content of ceramic particles and including as a polymerisable water-soluble monomer ammonium acrylate and/or ammonium methylmethacrylate mixing the slurry to reduce the size of any agglomerations de-aerating the slurry adding the slurry to a mould causing the monomers to polymerise removing the formed article from the mould after polymedisation is complete removing the liquid carrier to produce a "green" article heating the green article.

In another preferred aspect the green article is subjected to a machining step.

In order that the invention may well be understood it will now be described by way of illustration with reference to the following examples.

EXAMPLE I

Alumina (75 g), a premix solution (21.27 g) comprising ammonium acrylate 29.1%, methylenebisacrylamide 0.9% and the remainder water, and dispersants comprising ammonium salts of a 40 wt % polyacrylate solution (1 g) and a 30 wt % solution of polymethacrylate (2 g), were mixed together to form a homogeneous slurry. The slurry was then subjected to further mixing in a high shear mixer for two minutes to break apart any weak agglomerates. The slurry was then removed to a vacuum chamber and subjected to a reduced pressure of 3mm Hg to remove as much air from the slurry as possible. After removing from the vacuum chamber, initiator (ammonium persulphate 0.05 g) and catalyst (tetramethylethylenediamine 0.02 ml) were mixed with the slurry and the slurry was transferred to a mould. The slurry gelled within 5 minutes within the mould to produce a solid object in the shape of the mould into which it was cast. The article was removed from the mould and allowed to dry at room temperature for 2 days. This was followed by heating at 60° C. for a further day. Any remaining water was driven off at 90° C. for 3 h. The sample was then heated at a rate of 0.5° C./minute up to 400° C. and held for 3 h, followed by heating at rate of 1°C./minute up to 1550°C. The sample was allowed to soak for 2 h at this temperature and then was cooled at 5° C./minute to room temperature. The result was a sintered alumina body having a density of 3.79 g/cm$^3$.

EXAMPLE II

A slurry was prepared as in Example I. After removing from the vacuum chamber, initiator (ammonium persulphate 0.05 g) was mixed with the slurry and the sample was then transferred to a mould. This was placed in a 400 W microwave oven and subjected to microwave energy. The increase in temperature created by the microwaves catalysed the polymerisation reaction to produce a gelled article. The article was removed from the mould and dried and fired using the same procedure as in Example I to produce an article of dense alumina.

EXAMPLE III

A slurry was prepared as in Example I. After removing from the vacuum chamber, initiator (ammonium persulphate 0.05 g) was mixed with the slurry and the sample was then transferred to a mould. This was placed in an oven set at 70° C. The increase in temperature created by the heat in the oven catalysed the polymerisation reaction to produce a gelled article. The article was removed from the mould and dried and fired using the same procedure as in Example I to produce an article of dense alumina.

We claim:

1. A method of making a ceramic article, the method comprising the steps of:
   (a) forming an aqueous slurry comprising ceramic particles in a concentration in excess of 45% by volume of the slurry, and including as a polymerizable monomer ammonium acrylate and/or ammonium methylmethacrylate;
   (b) mixing the slurry to reduce agglomerations;
   (c) de-aerating the slurry;
   (d) adding the slurry to a mould;
   (e) causing the monomer to polymerize by adding a polymerization initiator and a catalyst;
   (f) removing the formed article from the mould after polymerization is complete;
   (g) removing the aqueous carrier to produce a "green" article; and
   (h) heating the green article to remove organic content and to increase the density of the article.

2. A method according to claim 1, wherein the slurry includes a dispersant.

3. A method according to claim 2, wherein the dispersant is an ammonium salt of a polyacrylate or an ammonium salt of a polymethacrylate.

4. A method according to claim 1, wherein the ceramic supporting article is formed by injection moulding or extrusion molding.

* * * * *